United States Patent
Haghighat et al.

(10) Patent No.: US 6,272,676 B1
(45) Date of Patent: *Aug. 7, 2001

(54) METHOD AND APPARATUS FOR FINDING LOOP_LEVER PARALLELISM IN A POINTER BASED APPLICATION

(75) Inventors: Mohammad R. Haghighat, Cupertino; Milind Girkar, Sunnyvale, both of CA (US)

(73) Assignee: Intel Corporation, Santa Clara, CA (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/006,276

(22) Filed: Jan. 13, 1998

(51) Int. Cl.[7] ...................................................... G06F 9/45

(52) U.S. Cl. ........................................ 717/7; 717/6; 717/9

(58) Field of Search .................................. 395/709, 707, 395/706; 717/6, 7, 9

(56) References Cited

U.S. PATENT DOCUMENTS

| | | | |
|---|---|---|---|
| 5,067,068 | * 11/1991 | Iwasawa et al. | 395/706 |
| 5,109,331 | * 4/1992 | Ishida et al. | 395/709 |
| 5,121,498 | * 6/1992 | Gilbert et al. | 395/708 |
| 5,265,253 | * 11/1993 | Yamada | 395/709 |
| 5,303,357 | * 4/1994 | Inoue et al. | 395/709 |
| 5,317,743 | * 5/1994 | Imai et al. | 395/706 |
| 5,450,554 | * 9/1995 | Zaiki | 395/706 |
| 5,522,074 | * 5/1996 | Endo | 395/709 |
| 5,577,253 | * 11/1996 | Blickstein | 395/705 |
| 5,584,027 | * 12/1996 | Smith | 395/707 |
| 5,797,013 | * 8/1998 | Mahadevan et al. | 395/709 |

OTHER PUBLICATIONS

Liu,S.–M.; Lo, R.; Chow, F.; "Loop Induction Variable Canoncalization in Parallelizing Compilers"; Proceedings of the 1996 Conference on Parallel Architectures and Compilation Techniques; pp. 228–237, Oct. 1996.*

Davidson, J.; Jinturkar, S.; "Improving Instruction–Level Parallelism by Loop Unrolling and Dynamic Memory Disambiguation"; Proceedings of the 28th Annual International Symposium on Microarchitecture; pp. 125–132, Nov. 1995.*

Maydan, D.; Hennessy, J.; Lam, M.; "Effectiveness of Data Dependence Analysis"; International Journal of Parallel Programming; vol. 23, No. 1, pp. 63–81, Feb. 1995.*

Larus, J.; "Loop–Level Parallelism in Numeric and Symbolic Programs"; IEEE Transactions on Parallel and Distributed Systems; vol. 4, No. 7, pp. 812–826, Jul. 1993.*

Aho, A.; Sethi, R.; Ullman, J.; "Compilers —Principles, Techniques and Tools"; Addison–Wesley Publishing Company; pp. 638–648,1986.*

M. R. Haghighat, *Symbolic Analysis for Parallelizing*, Kluwer Academic Publishers (1995), Contents pp. vii–ix, List of Figures pp. xi–xiii, Chapter 4–Induction Variables pp. 35–56.

* cited by examiner

Primary Examiner—Reba I. Elmore
(74) Attorney, Agent, or Firm—Blakely, Sokoloff, Taylor & Zafman LLP

(57) ABSTRACT

A method and apparatus for finding loop_level parallelism in a sequence of instructions. In one embodiment, the method includes the steps of determining if a variable which identifies a memory address of a data structure is an induction variable; and determining if execution of the sequence of instructions terminates in response to a comparison of the variable to an invariant value. If the two conditions of the present invention are found to be true, the respective sequence of instructions is a candidate to be flagged for multi-threading execution, assuming the loop of the instructions terminates.

21 Claims, 3 Drawing Sheets

METHOD AND APPARATUS FOR FINDING LOOP_ LEVER PARALLELISM IN A POINTER BASED APPLICATION

FIELD OF THE INVENTION

The present invention relates to data processing, and, in particular, to the detection of loop_level parallelism within a sequence of program instructions.

BACKGROUND OF THE INVENTION

In the past computer systems typically executed sequences of instructions in a computer program in a strict sequential order. That is, instructions were executed in the actual order of the computer program.

Executing instructions in strict sequential order presented many limitations on the efficiency of executing instructions. For example, often the microprocessor would sit idle while waiting for the completion of a memory operation (e.g., a memory location being read or written). Meanwhile, subsequent instructions, which were not dependent on the memory operation being completed would nevertheless be required to wait to be executed, even though the microprocessor was not busy.

However, as computer systems and microprocessors have evolved, computer systems now are able to execute programs more efficiently. For example, the microprocessors execute instruction in a pipelined manner. In other words, multiple instructions can be executed simultaneously. That is, while one instruction is being executed, a subsequent instruction can be decoded, and another instruction can be fetched from a memory location.

In addition, advanced computer systems are able to perform multitasking (i.e., simultaneously execute two or more programs in one computer system.) More than one program can run simultaneously in the same computer because of the differences between I/O and processing speed. While one program is waiting for input, instructions in another can be executed. During the milliseconds one program waits for data to be read from a disk, millions of instructions in another program can be executed. For example, in interactive programs, thousands of instructions can be executed between each keystroke on the keyboard.

Moreover, advanced computer systems may also perform multitasking within a single program, commonly referred to as multithreading. That is, multi-threading allows multiple streams of execution to take place concurrently within the same program, each stream processing a different transaction or message.

One example of multi-threading could include the simultaneous execution of the different iterations of a loop in a pointer-based computer program. A loop consist of a set of instructions in a program that are executed repeatedly, either a fixed number of times or until some condition is true or false. Each pass through the set of instructions is referred to herein as an iteration.

The separate iterations of a loop will often operate on data stored in one or more fields in a particular record 101 of a pointer based data structure. Subsequent iterations will either execute data stored in the same record 101, or alternatively proceed to process one or more fields of another record 103, which may be connected to the previous record by a pointer 101e, as shown in pointer based data structure of FIG. 1.

As a result, in order to be able to concurrently execute the separate iterations of loop in the pointer based program, it typically should first be determined that the iterations of the loop are not dependent on each other. That is, if a first iteration writes to a particular memory location, and a second iteration reads the same memory location, then the second iteration can not be executed prior to the completion of the first iteration. Otherwise, the second iteration may read invalid data at the memory location to be updated by the first iteration. The determination of whether two or more iterations in a loop of a program operate on the same memory location, and thereby potentially prevent the concurrent execution of the iteration, is sometimes referred to as memory disambiguation.

If it is determined that separate iterations of a loop do not operate on the same memory locations, than the separate iterations are independent and can be scheduled to be executed simultaneously (a.k.a., loop_level parallelism), assuming the respective loop terminates. On the other hand, if separate iterations of a loop could possibly operate on the same memory location (e.g., the same fields within a record), then the iterations should not be simultaneously executed.

Therefore, a need exist for a method of determining whether separate iterations within a loop in a sequence of instructions in a pointer based application are independent because they do not operate on the same memory locations.

SUMMARY OF THE INVENTION

The present invention provides a method for finding loop_level parallelism in a sequence of instructions. In one embodiment, the method includes the steps of determining if a variable which identifies a memory address of a data structure is an induction variable; and determining if execution of the sequence of instructions terminates in response to a comparison of the variable to an invariant value.

BRIEF DESCRIPTION OF THE DRAWINGS

The present invention is illustrated by way of example and not limitation in the figures of the accompanying drawings, in which like references indicate similar elements, and in which.

DETAILED DESCRIPTION

A method is described for finding loop_level parallelism within a loop of a pointer based computer program. In the following description, numerous specific details are set forth in order to provide a thorough understanding of the present invention. It will be apparent, however, to one of ordinary skill in the art that the present invention may be practiced without these specific details. In other instances, wellknown standards, structures, and techniques have not been shown in order not to unnecessarily obscure the present invention.

Figure 1:
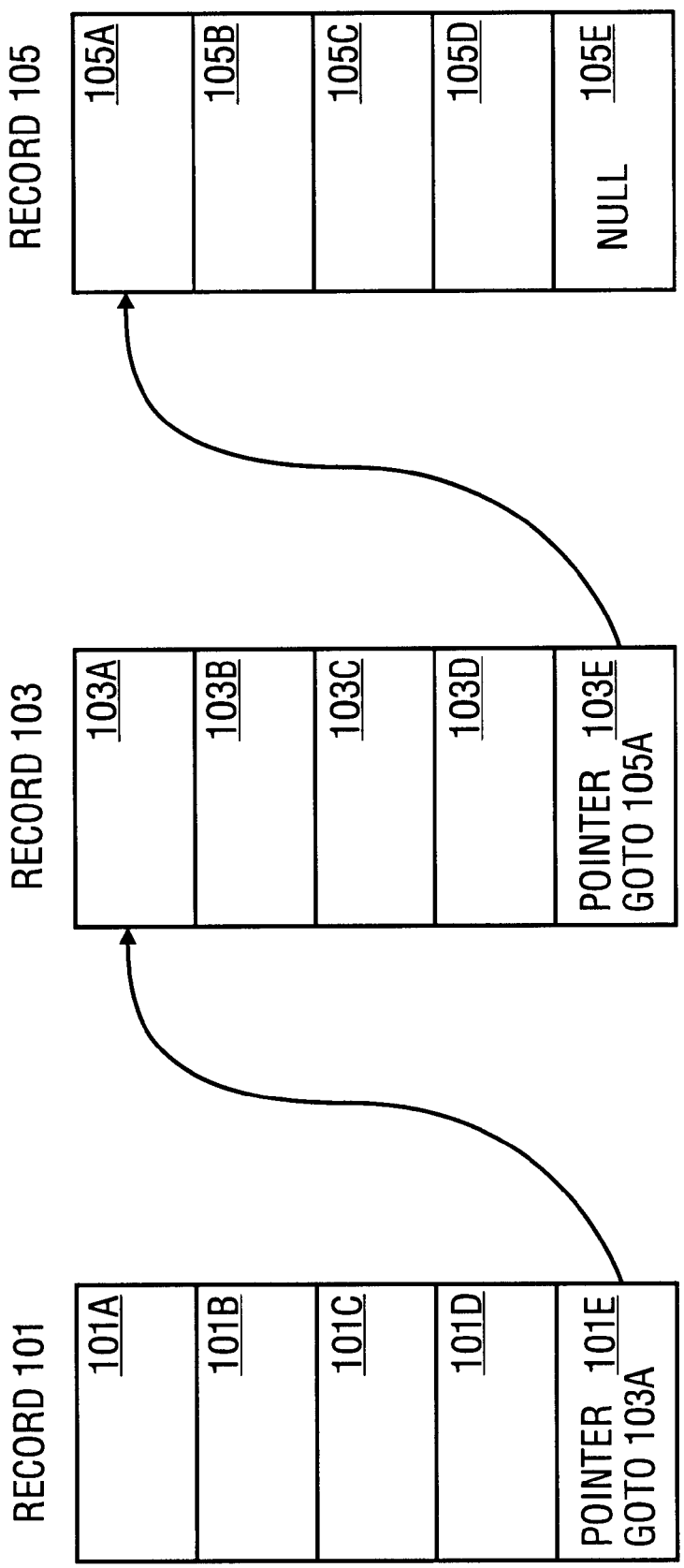
FIG. 1 illustrates separate data structures interconnected by pointers.
Figure 2:
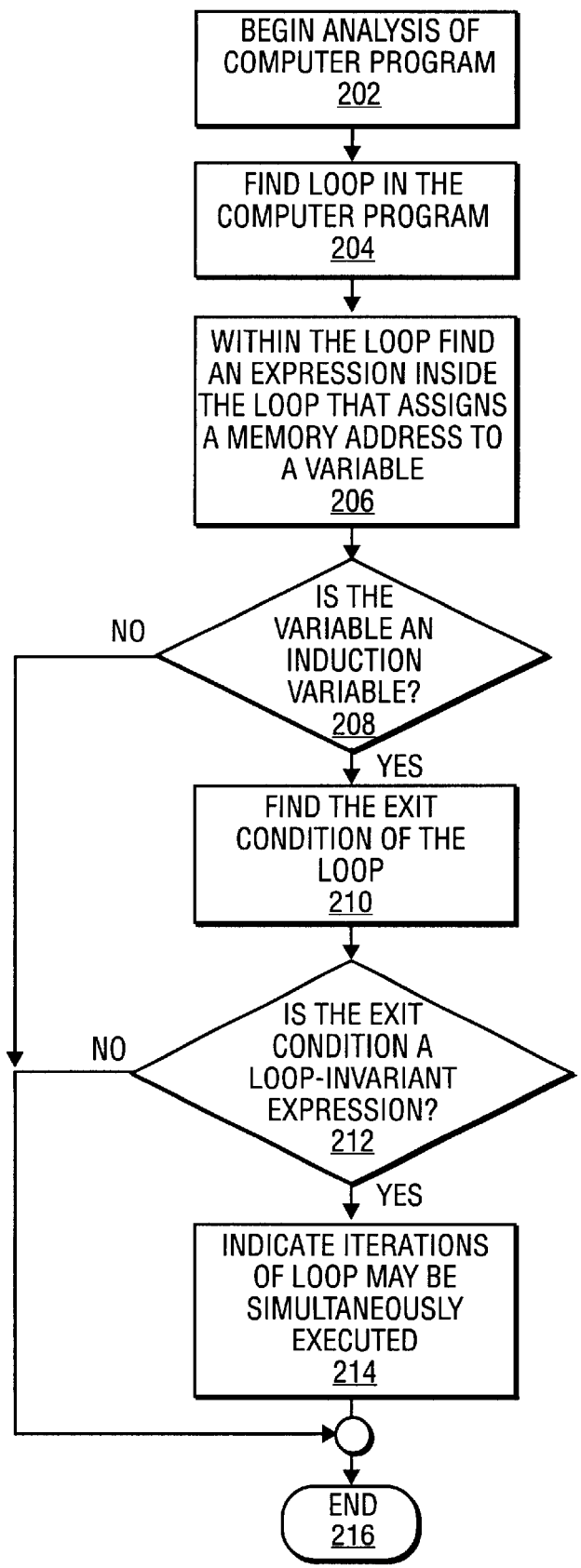
FIG. 2 illustrates a flow diagram describing the steps of finding loop_level parallelism according to one embodiment of the present invention.

FIG. 2 illustrates a flow diagram describing the steps for finding loop level parallelism with in a loop of a pointer based computer program. In one embodiment of the present invention, the logic of the steps for finding loop-level parallelism can be implemented in a compiler, which typically translates a program written in a high-level programming language (COBOL, C, C++, etc.) into machine language.

Alternatively, the logic of the steps for finding loop_level parallelism in a set of instructions can be implemented by other programs that analyze the control flow of programs, such as a binary translator. As such, the method of the present invention can be performed when translating a high level program into machine language, when done by a compiler, or when translating a program from a source architecture instruction set to a target architect instruction set, when done by a binary translator.

In step 202, the method of the present invention initiates the analysis of a program, or a set of instructions. In step 204, the method detects a loop within the program. Typically, the loop may be detected by a header at the beginning of the loop, which is a line in the program written in the respective high level programming language that identifies the function or procedure to follow, or by means of control-flow analysis.

After a loop in the set of instructions has been discovered, in step 206, the method of the present invention proceeds to search for an expression within the loop that assigns a value to a variable (e.g., updates) with a new memory location/address of a data structure (e.g., a record or field within a record in a pointer based data structure), which includes data that is to be processed during an iteration of the loop. For example, the expression may consist of assigning/updating a pointer variable with address of the next record that is to be processed during the next iteration of the loop.

In one embodiment, the expression can be identified by a "store" operation of a field referring to a variable that is local to the procedure that is being analyzed. The assumption is that the address of the variable is not taken, and thus, the variable may not be modified in another procedure that may be called by the current procedure.

Once a pointer assignment expression has been discovered, in step 208, the method of the present invention determines if the pointer is an induction variable. A variable of a loop is an induction variable if the sequence of values it assumes is predictable. In other words, if from the current value, one can infer the next value of the variable in a state-free fashion. For example, the pointer variable referenced above would be considered an induction variable if its only assignment in the loop is the pointer contained in the data structure being processed during the present iteration of the loop.

One method of determining whether the pointer variable is an induction variable is to determine whether the operand being assigned to the pointer variable is modified in any other lines within the loop. If the operand is not being modified in any other line of the code, the pointer variable can be considered an induction variable.

If it is determined in step 208, that the pointer variable is not an induction variable, the method of the present invention ends in step 216. On the other hand, if it is determined in step 208 that the pointer variable is an induction variable, the method of the present invention continues on to step 210, the method of the present invention searches for the exit condition of the loop. The exit condition of the loop may be represented in the internal representation that captures the program control-flow graph.

Once the exit condition of the loop is found, in step 212, the method of the present invention determines whether the exit condition becomes true when the value of the induction variable found in step 208 reaches a pre-defined value that is a loop invariant. A loop-invariant is an expression that yields a result that is independent of the number of times a loop is executed; a value that does not change as long as control stays within the loop.

In one embodiment, the first operand of the exit condition is the induction variable and a second operand can be determined to be a loop invariant if the operand is a constant or a variable defined outside the immediate loop. For example, if an exit condition consist of determining whether the pointer variable has a present value of NULL, then the exit condition qualifies the condition of step 212.

That is, the NULL value is a constant operand and the pointer variable would contain a value from a consecutive sequence of values defined outside the loop (as stored in the respective memory location.) Moreover, the second operand of the exit condition would be independent of the number of times the loop is executed.

If it has been determined in step 212, that the second operand of the exit condition of the loop is not a loop-invariant, the method of the present invention ends in step 216. Otherwise, the method of the present invention continues onto step 214, wherein the loop is marked or made available to have its iterations executed concurrently, for example, in a multi-threading environment.

One of the benefits of the method of the present invention is that the method determines when the iterations of a loop are not be interdependent, assuming the respective loop terminates. That is, no two iterations of the loop will process data from the same location. Therefore, the chance of a memory conflict between the two or more iterations is eliminated, once again, assuming the respective loop terminates.

More specifically, by determining that the pointer variable is an inductant variable (i.e., will not be modified other than in a predictable manner), we can assume that the loop will process a new data structure each iteration. That is, if the pointer variable is always assigned a value at the end of the iteration, which is not thereafter modified, the loop will proceed to process a different data structure addressed by the value of the updated pointer variable. Thus, the chances of more than one iteration of the loop processing the same data structure are eliminated.

Moreover, by determining that the exit condition includes a comparison of the pointer variable to a loop invariant, it is determined that the loop is intended to execute "through" a series of data structures until it reaches a particular final data structure (assuming it terminates), as opposed to executing one or more data structures repeatedly for a predetermined number of iterations.

Therefore, by confirming the existence of the two conditions, it is determined that the iterations of the loop are independent and will not process data from the same memory location, assuming the loop terminates. As a result, the separate iterations of the loop can be executed concurrently in a multi-threading environment.

Shown below is an example of a pointer based application that meets the conditions of the present invention to be identified as available for multi-threading.

1) P=list
2) loop
3) if (P=null) then exit;
4) assign variable A the value of field_j of P;
5) assign field_k of P the value of C;

6) assign P the value of field_next (pointer to next list) of P;

7) end loop

As shown above in the example pointer based application, the loop will continue to execute until P is equal to null, in line 3. P is a variable that is assigned the memory address of the list that is to be processed by the code, in line 1. In line 6 of the code, P is assigned the field_next of the list presently being processed. That is, P is assigned the memory address of the next list that is to be processed by the next iteration of the loop (i.e., the pointer of the list currently processed by the loop).

As a result, P satisfies the condition of an inductant variable because it is not be modified other than in a predictable manner (i.e., it is always assigned the value of the pointer in the list currently being processed by the loop.) Moreover, the exit condition of the loop in line 3 include comparing the inductant variable of P to the loop invariant null.

Figure 3:
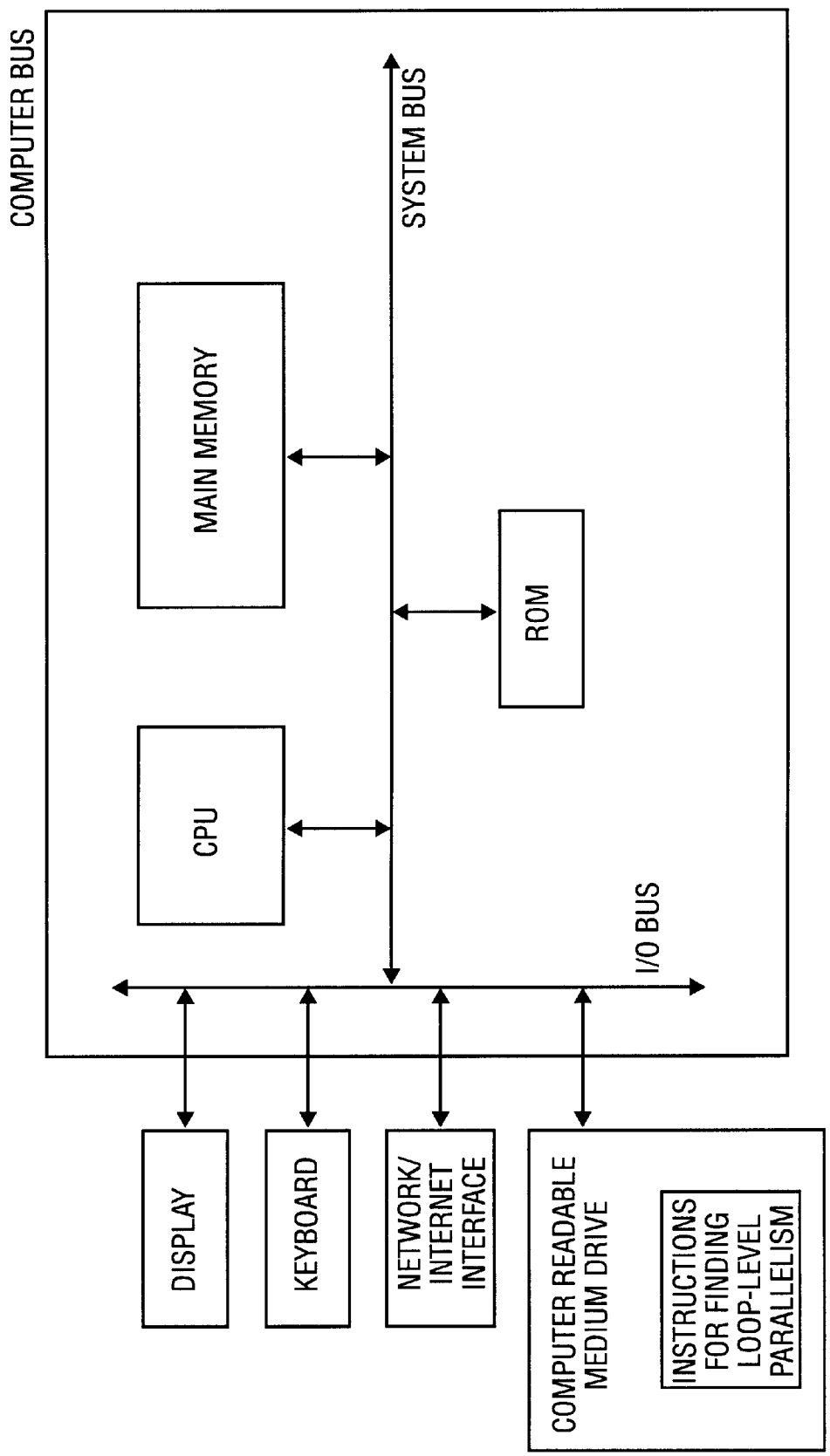
FIG. 3 illustrates a computer system having a computer readable medium with instructions stored thereon for finding loop_level parallelism according to one embodiment of the present invention.

As discussed above, the method of the present invention may be implemented in a compiler program, or alternatively a binary translator. As such, the method of the present invention may be stored on a storage medium having stored thereon instructions which can be used to program a computer to perform the method according to the present invention. The storage medium can include, but is not limited to, any type of disk including floppy disks, optical disks, CD-ROMs, and magneto-optical disks, ROMs, RAMs, EPROMs, EEPROMs, magnet or optical cards, or any type of media suitable for storing electronic instructions. For example, method of the present invention can be stored on computer-readable mediums, such as magnetic disks or optical disks, that are accessible via a disk drive (or computer-readable medium drive), such as the disk drive shown in FIG. 3.

In the foregoing specification the invention has been described with reference to specific exemplary embodiments thereof. It will, however, be evident that various modifications and changes may be made thereto without departing from the broader spirit and scope of the invention. The specification and drawings are, accordingly, to be regarded in an illustrative rather than restrictive sense.

What is claimed is:

1. A computer-implemented method for finding loop_level parallelism in a sequence of instructions during a binary translation, the method comprising:

receiving said sequence of instructions for translating said instructions executable in a source instruction set Architecture into instructions executable in a target instruction set Architecture during a binary translation;

determining if a variable identifying a memory address of a data structure is an induction variable; and determining if an execution of the sequence of instructions terminates in response to a comparison of said variable to an invariant value, said invariant value invariant within said sequence of instructions, to identify said sequence of instructions as having loop_level parallelism.

2. The method of claim 1, wherein the sequence of instructions is a loop within a computer program.

3. The method of claim 2, wherein in response to determining said variable identifying a memory address of a data structure is an induction variable and also determining execution of the sequence of instructions terminates in response to an invariant expression, separate iterations of said sequence of instructions may be executed simultaneously in a multithreading environment.

4. The method of claim 1, wherein the variable identifying a memory address of a data structure is a pointer variable identifying a data structure that is to be processed by the sequence of instructions on a subsequent iteration of said sequence of instructions.

5. The method of claim 4, wherein the determining if the variable identifying a memory address of a data structure is an induction variable includes determining if the variable is modified by said sequence of instructions.

6. The method of claim 1, wherein the invariant value is a value that is independent of execution of the sequence of instructions.

7. The method of claim 6, wherein the invariant value is a value that is not modified by execution of the sequence of instructions.

8. A computer-readable medium having stored thereon a plurality of instructions, including a first set of instructions for finding loop_level parallelism, during a binary translation, in a sequence of instructions to be executed, said first set of instructions, when executed by a processor, cause said processor to perform a computer method of:

receiving said sequence of instructions for translating said instructions executable in a source instruction set Architecture into instructions executable in a target instruction set Architecture during a binary translation;

determining if a variable identifying a memory address of a data structure is an induction variable; and determining if an execution of the sequence of instructions terminates in response to a comparison of said variable to an invariant value, said invariant value invariant within said sequence of instructions, to identify said sequence of instructions as having loop_level parallelism.

9. The computer-readable medium of claim 8, wherein the sequence of instructions to be executed is a loop within a computer program.

10. The computer-readable medium of claim 9, wherein in response to determining said variable identifying a memory address of a data structure is an induction variable and also determining execution of the sequence of instructions terminates in response to an invariant expression, separate iterations of said sequence of instructions may be executed simultaneously in a multithreading environment.

11. The computer-readable medium of claim 8, wherein the variable identifying a memory address of a data structure is a pointer variable identifying a data structure that is to be processed by the sequence of instructions on a subsequent iteration of said sequence of instructions.

12. The computer-readable medium of claim 11, wherein determining if the variable identifying a memory address of a data structure is an induction variable includes the step of determining if the variable is modified by said sequence of instructions.

13. The computer-readable medium of claim 8, wherein the invariant value is a value that is independent of execution of the sequence of instructions.

14. The computer-readable medium of claim 13, wherein the invariant value execution of the sequence of instructions.

15. A binary translator implemented on a computer-system to find loop_level parallelism in a sequence of instructions, the translator comprising of:

a first set of instructions translate said instructions executable in a source instruction set Architecture into instructions executable in a target instruction set Architecture during a binary translation;

a first set of instructions to determine if a variable identifying a memory address of a data structure is an induction variable; and a second set of instructions to determine if an execution of the sequence of instructions terminates in response to a comparison of said variable to an invariant value, said invariant value invariant within said sequence of instructions, to identify said sequence of instructions as having loop_level parallelism.

16. The binary translator of claim 15, wherein the sequence of instructions is a loop within a computer program.

17. The binary translator of claim 16, wherein in response to determining said variable identifying a memory address of a data structure is an induction variable and also determining execution of the sequence of instructions terminates in response to an invariant expression, separate iterations of said sequence of instructions may be executed simultaneously in a multithreading environment.

18. The binary translator of claim 15, wherein the variable identifying a memory address of a data structure is a pointer variable identifying a data structure that is to be processed by the sequence of instructions on a subsequent iteration of said sequence of instructions.

19. The binary translator of claim 18, wherein the instructions for determining if the variable identifying a memory address of a data structure is an induction variable further includes instructions for determining if the variable is modified by said sequence of instructions.

20. The binary translator of claim 15, wherein the invariant value is a value that is independent of execution of the sequence of instructions.

21. The binary translator of claim 20, wherein the invariant expression is a value that is not modified by execution of the sequence of instructions.

* * * * *

UNITED STATES PATENT AND TRADEMARK OFFICE
CERTIFICATE OF CORRECTION

PATENT NO. : 6,272,676 B1
DATED : August 7, 2001
INVENTOR(S) : Haghighat et al.

Page 1 of 1

It is certified that error appears in the above-identified patent and that said Letters Patent is hereby corrected as shown below:

Title page,
Item [54], Title, please delete "LOOP_LEVER" and replace with
-- LOOP_LEVEL --.

Column 6,
Line 57, before "execution" insert -- expression is a value that is not modified by --.

Signed and Sealed this

Sixteenth Day of April, 2002

Attest:

*Attesting Officer*

JAMES E. ROGAN
*Director of the United States Patent and Trademark Office*